(No Model.)
M. W. DEWEY.
METHOD OF ELECTRIC WELDING.
No. 435,644. Patented Sept. 2, 1890.
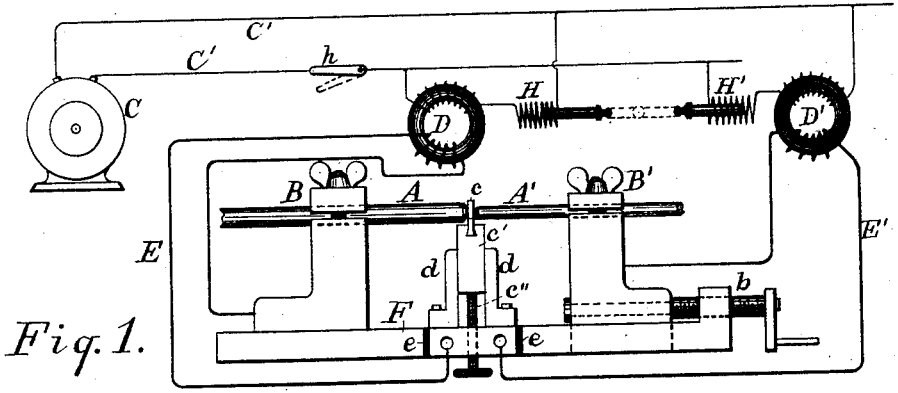
Fig. 1.
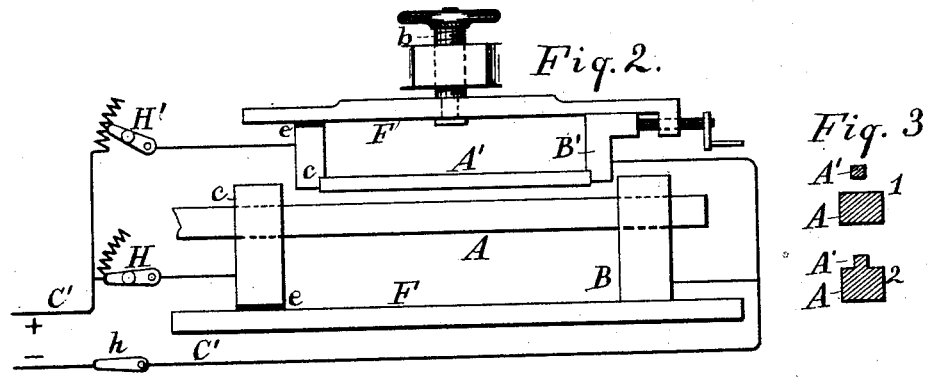
Fig. 2.
Fig. 3
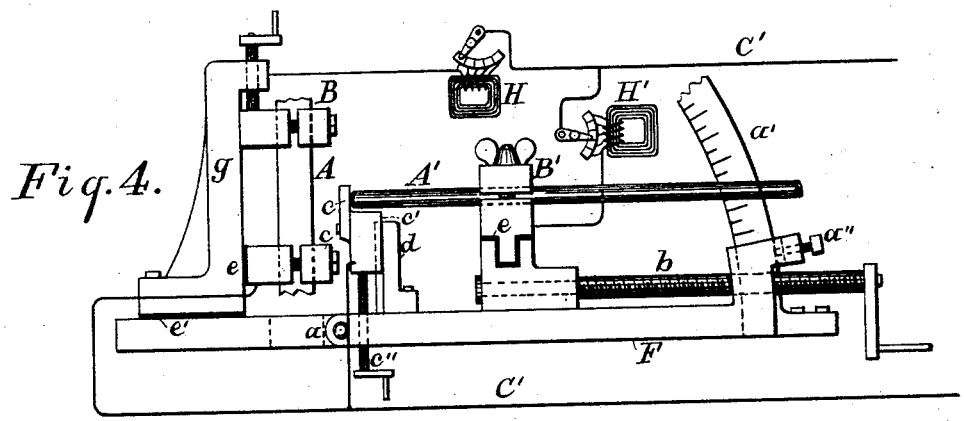
Fig. 4.
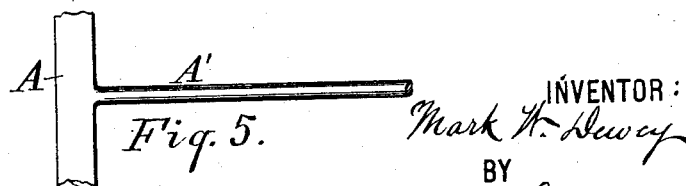
Fig. 5.
WITNESSES:
C. L. Bendixon
J. J. Laass
INVENTOR:
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC WELDING.

SPECIFICATION forming part of Letters Patent No. 435,644, dated September 2, 1890.

Application filed June 14, 1890. Serial No. 355,408. (No model.)

*To all whom it may concern:*

Be it known that I, MARK W. DEWEY, of Syracuse, in the county of Onondaga, in the State of New York, have invented new and useful Improvements in the Method of Electric Welding, (Case No. 62,) of which the following, taken in connection with the accompanying drawings, is a full, clear, and exact description.

My invention relates to certain improvements in the art or process of electric welding.

The object of my invention is to provide an improved method for uniting metal bars or blanks of unlike or different conductivity or size, whether of the same or of different specific resistance.

The object of my invention also is to join bars or blanks at an angle to each other, and especially when one of the pieces is of greater conductivity than the other piece.

My invention consists in making contact with both pieces to be united and passing a current of greater strength or volume through one piece than the other.

The invention consists also in making contact with both pieces to be united, passing currents through both pieces, and proportioning the volume of the currents to the conductivity of the pieces to produce the same welding temperature in both pieces simultaneously.

The invention consists, further, in clamping said pieces at an angle to each other, passing a current through said pieces until they are sufficiently softened, and then pressing the pieces together to unite them while maintaining them at the angle at which they were clamped.

My invention consists also in other details hereinafter described, and specifically set forth in the claims.

In the drawings, Figure 1 is a side elevation of apparatus in connection with a diagram of circuits for carrying out my invention. Fig. 2 shows another form of apparatus to effect a weld in accordance with my invention when the pieces are parallel. Fig. 3 shows cross-sections of the work before and after the operation. Fig. 4 is a side elevation of an apparatus for making T-joints or uniting pieces at an angle to each other; and Fig. 5 shows a T or angular joint after the weld is effected.

Referring specifically to the drawings, in Fig. 1, B and B' indicate the clamps for holding the pieces of metal A and A' in position in line with each other while being heated by the current preparatory to the joining or welding together of said pieces and the pressing or moving together of the same.

C indicates a primary source of alternating currents; C' C', the leads extending therefrom; D and D', inductional transformers having their primary coils connected in parallel lines with the leads, and E and E' are the secondary circuits of said transformers and in which are induced currents of increased volume and decreased electro-motive force. The terminals of the secondaries that are of the same polarity at the same time are connected to the clamps B and B', while the other terminals are connected to a movable conducting block or plate $c$, located between and making contact with the adjacent ends of the bars to be united.

The bar or piece A is of larger size or of greater cross-section than A', and is held by the stationary clamp B, while the piece A' is held by the clamp B', which can be moved by means of the screw $b$ toward and from the other clamp. This apparatus is shown arranged for butt-welding, and the ends to be united are placed facing each other.

In the prior methods of electric welding equal quantities of current were passed through both bars. Consequently if the bars were of unequal size or resistance the bar having the lowest resistance was not brought to a welding temperature until after the other, necessitating often a heating of the small bar to too high a temperature; but in my method each of the bars receives an amount of current depending upon its resistance or conductivity, so that the smaller one, or the one having the highest resistance, will not be burned or arrive at a welding temperature before the other, but at the same time, which is very essential.

The plate $c$ is fixed in a metal block $c'$, adapted to slide toward and from the bars and between guides $d$ $d$ by means of a screw $c''$, working through the base F of the apparatus. The portion of the base supporting the guides $d$ $d$ and through which the screw $c''$ passes is insulated from the rest of the base by insulation $e$ $e$ to prevent the current short-circuiting through the clamps and base.

$h$ indicates a break-switch in one of the leads C' to interrupt the current entirely, as at the completion of an operation, and H and H' are current-regulators. The said regulators consist of coils of wire in circuit with their respective primary coils of the transformers and movable iron cores. The current is regulated by shifting the position of the core and acts to set up more or less counter electro-motive force.

The cores may be shifted independently by the operator, or can be connected together by a bar, as shown in dotted lines in the drawings, so that one core will be moved in its coil while the other is moved out, thus allowing more current to flow through one primary coil than the other.

In Fig. 1 the regulators are arranged so that a greater current flows through the primary of H than of H'. Corresponding currents are induced in the secondaries. The secondary E, in which the greatest current is induced, is in contact with bar A, while the secondary E' is in contact with bar A'.

The operation, briefly, is as follows: After the bars A and A' are placed in position, as shown and described, the currents flowing through each bar are regulated so that the greater part will flow through the largest bar, or the bar having the lowest resistance, and so that both bars will be brought to a working or welding temperature at the same time. When a welding temperature is reached, the plate $c$ is moved or lowered by means of the screw $c''$, so that the clamp B' and the bar A' can be moved by means of the screw $b$ to press the ends of the bars together to complete the weld. The current through the bars may be interrupted either before or after the ends are forced together by means of the switch, as the lowering of the plate does not necessarily break the circuit, as it may not be removed from contact with the bars.

I do not limit myself to the employment of but one plate $c$ between the bars, as two such plates may be used, one for each bar, and suitably insulated from each other and each connected independently with a terminal of a secondary similarly to the manner in which the bars are connected in Fig. 2, hereinafter described.

In Fig. 2 the bars A and A' to be united are also of a different size, but are held side by side parallel to each other, and are to have their adjacent sides welded together. The upper and smaller bar A' is connected with the circuit at its extreme ends, while the bar A is connected at points at short distances from its ends; but it will be obvious, however, that they may be connected with the circuit or circuits at any suitable points to heat the bars at the parts desired. The current in this case may be supposed to be a direct current and the current-regulators H H', located in branches of the main circuit C', ordinary adjustable resistances. The levers of the resistances are shown in position to permit the greater part of the current to flow through the bar A. After the bars have been sufficiently heated or softened the bar A', with its clamping-frame, is lowered by means of a screw $b$ to force the two bars together to unite or weld them. In this case there are two independent contacts $c$, and only one of them is movable.

At 1 in Fig. 3 a cross-sectional view of the bars is shown before being welded together, and at 2 in the same figure a view after they are welded. By this method ribs and flanges may be fixed to bars and blanks of metal and grooves formed therein, saving much time usually spent in making castings and in planing them and allowing the employment of wrought-iron or steel instead of cast-iron.

In Fig. 4 an apparatus is arranged for forming angle-joints, or more particularly T-joints, with bars.

C' C' indicate the leads from a suitable source of heavy alternating current, H and H' current-regulators in parallel or multiple arc connection with said leads and similar to those shown in Fig. 1, but having cores that form complete magnetic circuits, and switch-levers to cut in and out the convolutions of the coils wound upon said cores to vary the counter electro-motive force. The apparatus shown in this figure is similar to that shown in the other figures hereinbefore described, and I shall therefore simply point out the essential differences. The bars A A' are clamped and supported independently of but at right angles to each other to form a T-joint.

To form joints at other angles, the base F, upon which the clamp B' is mounted, is provided with a hinge $a$ and a curved but stationary bar $a'$, provided with a scale, and can be raised at its free end with the clamp B' and bar A', and the set-screw $a''$ employed to set the base to the curved bar $a'$ at any desired angle to the stationary part of said base supporting the clamped bar A. The latter bar is clamped in perpendicular position to an upright $g$, which is insulated from the base by insulation $e'$. In this case also one of the contacts $c$ remains stationary during the operation, but the other, as shown, must be moved somewhat to permit the joining of the pieces. If it is not desired to move said contact, it can be placed against the side of the bar or piece A' close to its end, and not directly over its end and between the bars, as shown in the figure, and in some cases the bars may be in contact with each other during the heating thereof. After the T-joint is formed of the pieces of metal shown in this apparatus it resembles that shown in Fig. 5.

With the exception of placing the bars at an angle to each other and heating and uniting them by the electric current and pressure while in this position, the operation is the same as the operation of the apparatus in Fig. 1, hereinbefore fully described.

Having described my invention, what I claim as new, and desire to secure by Letters Patent, is—

1. The herein-described improvement in welding metals electrically, consisting in making contact with both pieces to be united and passing a current of greater strength through one piece than the other.

2. The herein-described process of welding metals electrically, consisting in making contact with both pieces independently of each other, passing a current of greater strength through one piece than the other until the pieces are sufficiently heated, and then pressing the pieces together, as desired.

3. The herein-described improvement in welding together electrically pieces of metal of different conductivity, consisting in making contact with both pieces to be united and passing a current of greater strength through the piece having the lowest resistance than through the other.

4. The herein-described improvement in welding together electrically pieces of metal of different conductivity, consisting in making contact with both pieces to be united, passing currents through both pieces, and proportioning the strength of the currents to the conductivity of the pieces to produce the same welding temperature in both pieces simultaneously.

5. The herein-described improvement in welding together electrically pieces of metal of different conductivity, consisting in dividing a current and passing the same through a plurality of branches, making contact between the branches and the pieces to be united, and passing currents of unequal strength through said branches according to the conductivity of the pieces to produce the same welding temperature in the plurality of pieces simultaneously.

6. The herein-described process of welding metals electrically, consisting in making contact with both pieces independently of each other, passing a current of greater strength through one piece than the other until the pieces are sufficiently heated, moving one of said contacts, and then pressing the pieces together, as desired.

7. The method of manufacturing angle-joints of pieces of metal, consisting in clamping the pieces to be welded together at the desired angle to each other, passing a current through said pieces until they are sufficiently softened, and then pressing the pieces together to unite them while maintaining them at the angle at which they were clamped.

8. The method of manufacturing angle-joints of pieces of metal, consisting in clamping the pieces to be welded together at the desired angle to each other, passing a current through each of said pieces until they are sufficiently softened, proportioning the strength of the currents to the conductivity of the pieces, and then pressing the pieces together to unite them while maintaining them at the angle at which they were clamped.

In testimony whereof I have hereunto signed my name this 12th day of June, 1890.

MARK W. DEWEY. [L. S.]

Witnesses:
 C. H. DUELL,
 J. J. LAASS.